April 14, 1936.    C. D. FATOR    2,037,016
INDICATING SYSTEM FOR PNEUMATIC TIRES
Filed Aug. 3, 1934    2 Sheets-Sheet 1
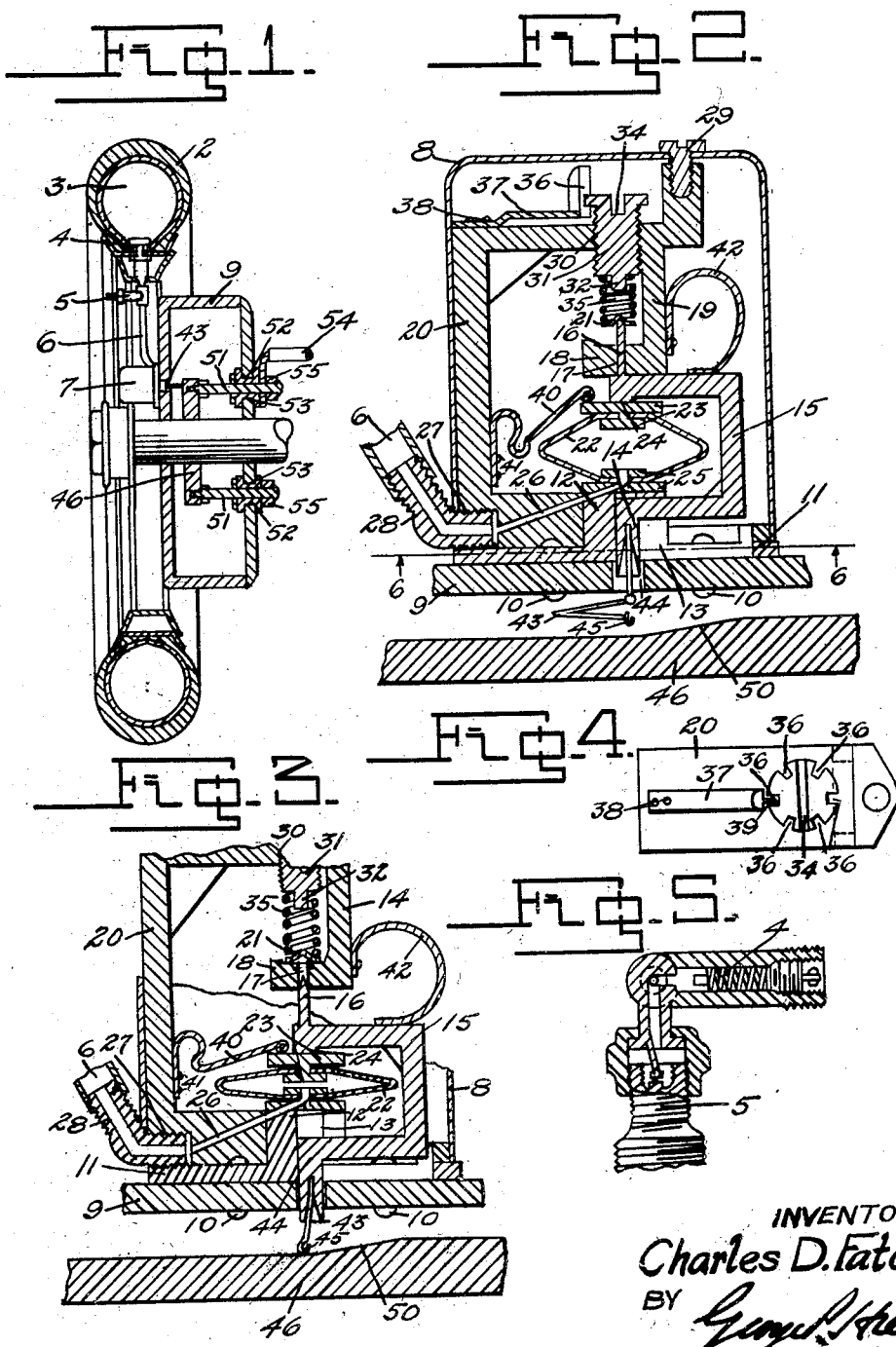
INVENTOR
Charles D. Fator
BY
ATTORNEY April 14, 1936.  C. D. FATOR  2,037,016
INDICATING SYSTEM FOR PNEUMATIC TIRES
Filed Aug. 3, 1934  2 Sheets-Sheet 2
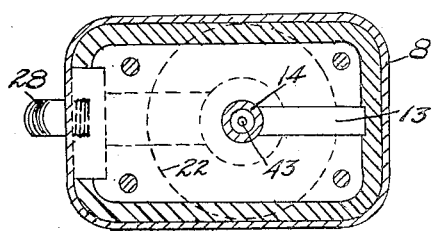
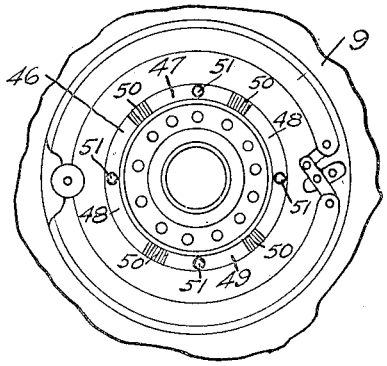
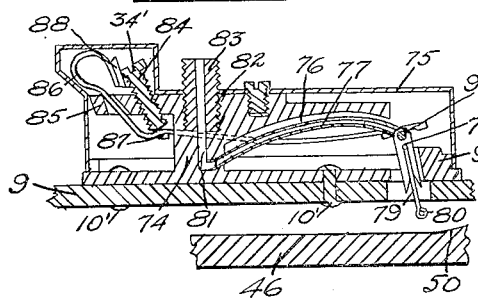
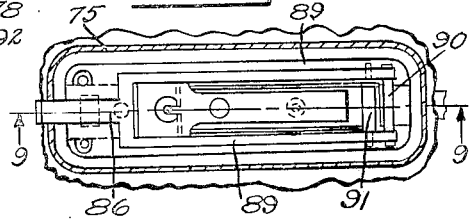
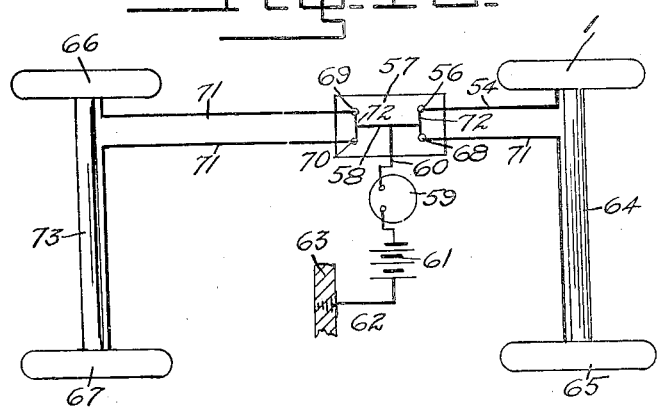
INVENTOR
Charles D. Fator.
BY
ATTORNEY.

Patented Apr. 14, 1936

2,037,016

UNITED STATES PATENT OFFICE 2,037,016

INDICATING SYSTEM FOR PNEUMATIC TIRES

Charles D. Fator, Presidio of San Francisco, Calif.

Application August 3, 1934, Serial No. 738,260

3 Claims. (Cl. 177—311)

(Granted under the act of March 3, 1883, as amended April 30, 1928; 370 O. G. 757)

This invention described herein may be manufactured and used by and for the Government for governmental purposes, without the payment to me of any royalty thereon.

This invention relates to an improved indicating system for motor vehicles, more particularly it is directed to an electrical indicating system which is adapted to automatically indicate predetermined sub-air pressures within pneumatic tires provided on the wheels of the vehicle.

One of the objects of my invention is to provide an indicating system for motor vehicles including a specially designed pneumatically operated electric switch mounted on each of the wheels of the vehicle, an indicating device for each of said switches, said switches being adapted to be operated by the air-pressure within the tires of the vehicle for actuating the said indicating devices to cause the same to give a plurality of different signals when the amount of air pressure within the tires has been reduced to below normal.

Another object of my invention is to provide an improved pneumatically operated switch or circuit-closer for operating an indicating device to determine the amount of air pressure within a pneumatic tire of a motor vehicle, wherein one of the elements of the switch is subject to the direct action of the air pressure within the tire.

Another object of my invention is to provide a switch arrangement in which one part thereof is secured relative to a stationary part of a motor vehicle adjacent the wheel, while the other part thereof is secured to the wheel and revolves therewith, a part of the mechanism of the switch under these circumstances making a wiping contact to close and open an electric circuit connected to a signal indicating device, whereby a plurality of different intermittent signals are produced by the indicating device depending on the amount of air pressure in a pneumatic tire provided on the vehicle.

Briefly stated, the indicating system includes electrical circuits having indicating devices and specially designed pneumatically operated electrical switches in circuit therewith, one of the switches being applied to a wheel of the vehicle and connected with the air chamber of a pneumatic tire mounted thereon, the said switch being adapted to operate when the vehicle is in motion, first, to cause the indicators to give a relatively slow series of intermittent signals when the pressure in the tires are slightly below a predetermined pressure; second, to register intermittent signals, double the speed of the first signal when the air pressure reaches a destructive low; and last, registering a steady, continuous signal when the air pressure has reached nil or in other words when the tire has become flat. The last mentioned continuous signal registering whether the vehicle is in motion or at rest.

In principle the system depends on the movement of the vehicle and the resultant rotation of the wheels thereof to gain the intermittent signals used to signal the sub-pressure in the tire of the vehicle.

With the above and other objects in view, the invention specifically consists of features of construction, arrangement and operation of parts which will hereinafter appear. For purposes of illustration, the invention will be described with reference to the accompanying drawings in which like members are indicated by similar reference characters and in which—

Fig. 1 is a vertical sectional view partly in elevation through a wheel and adjacent portions of a motor vehicle with my improved pneumatically operated switch secured to the wheel and connected with a pneumatic tire provided thereon;

Fig. 2 is an enlarged sectional detail view of the switch shown in a vertical or upright position;

Fig. 3 is a partial detail view of the switch in an operative position;

Fig. 4 is a top plan view of a locking spring means for a tension adjustment assembly mounted on a bracket used in carrying out my invention;

Fig. 5 is a longitudinal sectional view of an adapter used in carrying out my invention;

Fig. 6 is a cross sectional view taken on line 6—6 of Fig. 2;

Fig. 7 is a vertical sectional view illustrating the relative location of a part of my improved switch with respect to the brake mechanism mounted within the brake housing of the wheel;

Fig. 8 is a top plan view of a modified form of pneumatically operated electric switch with the top of the casing removed therefrom;

Fig. 9 is a longitudinal sectional view thereof taken on line 9—9 of Fig. 8, and Fig. 10 is a diagrammatic view of an electrical circuit and apparatus embodying my invention.

In the illustrated embodiment characterizing my invention, the wheel 1 of a motor vehicle is provided with a pneumatic tire 2 containing an inner tube 3 which is adapted to be inflated through a valve 4 of conventional construction having an air adapter 5 as illustrated more particularly in Fig. 5 of the drawings, connected thereto which serves as a ready means for inflation of the tire and connecting an air tube 6 from the adapter 5 to my improved pneumatically operated electric switch 7 inclosed within a housing 8 and secured to the brake drum 9 by means of bolts 10 or the like, the brake drum being mounted on the wheel.

Referring more particularly to Figs. 2 and 3 of the drawings, the pneumatic switch 7 comprises a base plate 11 attached to the outer surface of the brake drum 9 and provided with a centrally located inwardly projecting portion 12 closed at the upper end thereof and containing a guide slot 13 in which a downwardly extending portion 14 of a U-shaped movable arm member 15 is adapted to move upon movement of the arm member. The arm member 15 contains an upwardly projecting pin 16 on the upper end thereof which is adapted to project through an aperture 17 provided in an end 18 bent at right angle to a depending portion 19 of a supporting bracket 20 and to abut against a washer 21. A pill box type of pneumatic cell 22 made of any suitable material such as flexible sheet metal or impregnated air tight fabric is provided within the U-shaped arm member 15. The upper end of the pneumatic cell is secured by soldering or otherwise, between disks 23 which are suitably secured to the arm member 15 at 24 and movable therewith, while the lower end of the cell 22 is suitably connected between fixed plates 25 to the upper surface of the projecting portion 12 of the base plate 11. A channel 26 is provided which leads from within the cell 22 through the fixed plates 25 and the lower end of the bracket 20 and terminates in a screw-threaded well 27 in which one end of a bushing 28 is threadedly mounted, the other end of the bushing 28 being adapted to be connected to one end of the tube 6, which is connected by its other end to the air adapter 5 thereby providing an air passageway from the inner tube 3 of the tire to the pneumatic cell 22. The supporting bracket 20 is mounted on the base 11 and secured to the housing 8 by a screw 29. A screw-threaded aperture 30 is provided in the upper end of the bracket 20 in which an adjusting screw 31 is threadably mounted in line with the pin 16 of the arm member 15. The inner end of the adjusting screw 31 terminates in a reduced end portion 32 having a shoulder on which one end of a compression spring 35 is adapted to abut while the other end of the spring 35 is adapted to bear against the washer 21. The head of the tension screw 31 is provided with a screw driver slot 34 for adjusting the screw within the aperture 30 and has a plurality of spaced notches 36 around the outer periphery thereof for engagement with a residual spring member 37 which is fixably secured by screws 38 or the like at one end to the bracket 20, and provided with a screw driver locking tip 39 on the free end thereof for engagement with the notches 36 to hold the screw in adjusted position within the aperture 30. A suitable bent spring member 40 may be provided which is fixably secured by one end to the bracket 20 by screws 41 or the like, the free end of the spring member being adapted to bear against the upper plate 23 secured to the arm member at 24. An electrical conductor 42 is suitably connected between the bracket and the movable arm member for making a positive electrical connection therebetween.

The movable arm member 15 is provided with an electrical contact wiper 43 one end of which is suitably affixed to the end of the downwardly extending portion 14 thereof while its other or free end projects through an aperture 44 provided in the brake drum 9 and terminates in an electrical contact tip 45 made of tungsten or the like, which is adapted to contact with a ring 46 provided with a plurality of variable contact sections, including a high contact section 47, a low contact section 48 and an intermediate high contact section 49, which are tapered at 50 and across which the contact tip 45 of the wiper brush 43 is adapted to move while in contact therewith.

The contact ring 46 is fixedly mounted within the brake housing 9 of the wheel, by means of rods 51 which are affixed by one end to the contact ring 46, the other end of the rods 51 extend through insulated bushings 52 which are provided in apertures 53 formed in the side of the brake housing. A suitable insulated conductor 54 of an electrical signaling circuit, illustrated in Fig. 10, of the drawings, is secured by one end to the outer end of one of the rods 51 by a jam nut 55, the other end of the conductor 54 being connected to a signaling indicator device 56 mounted on a special panel or instrument board 57. The indicating device 56 is connected in circuit with a common conductor 58 which in turn is connected in circuit with the ignition switch 59 of the electrical system of the vehicle by the conductor 60. The ignition switch 59 is connected to the battery 61 and grounded at 62 to the frame 63 of the vehicle, the circuit of the indicator 56 being completed through the frame of the vehicle to the front axle 64 thereof.

The above description applies equally as well to each of the pneumatic switches mounted on each of the other wheels 65, 66 and 67 of the vehicle, a separate indicating device 68, 69 and 70 being provided for each of the other pneumatic switches provided on each of the last mentioned wheels and connected to said switches by conductors 71. The indicating devices 56, 68, 69 and 70 for the pneumatic switches are grouped together on the instrument board or special panel 57 and are connected in circuit with each other by the common conductor 58 and connecting wires 72, the circuit from the indicator 68 also being completed through the front axle 64 of the vehicle and the circuits for the indicators 69 and 70 being completed from the ground 62 through the frame 63 to the rear axle 73 of the vehicle.

The modified form of my improved pneumatically operated switch which is illustrated in Figs. 8 and 9 of the drawings, serves the same purpose and operates in substantially the same manner as my preferred form of pneumatic switch 7, disclosed above, and comprises a base plate 74 secured to the brake drum 9 by any suitable means such as bolts 10 or the like, and provided with a casing 75, the base plate 74 is provided with a cut-out portion 76 having an arcuate shaped top surface in which a radial tube 77 preferably of the Baumé type is mounted. An arm member 78 having a contact wiper brush 79 terminating in an electrical contact tip 80 is secured to one end of the tube 77, the other end of the tube is fitted in the inner end of the air duct 81 which leads to a screw-threaded well 82 provided on the upper side of the base plate 74 and in which one end of a bushing 83 is screw-threadably mounted, the other end of the bushing 83 being adapted to be connected to one end of the air tube 6 which leads to the adapter 5, as illustrated in Fig. 1 of the drawings. An adjusting tension screw 84 is screw-threadably mounted in a projecting portion 85 of the base plate, and is adapted to be screwed against a portion of a tension spring 86 which in turn bears against a lug 87 provided on the base plate. The head of the adjusting screw 84 is provided with a screw-driver slot 84' for adjusting the pressure of the screw and a plurality of notches around the outer periphery thereof in which a screw-driver locking tip 88, provided on the upper end of the tension spring 86, is adapted to engage for holding the screw in adjusted position on the base plate.

The tension spring 86 is provided with a substantially fork-shaped end portion forming arms 89 which extend across the base plate on each side thereof, and provided with a cross bar 90 on the free ends thereof, which is adapted to bear against a cross pin 91 provided in the brush holder arm 78. The cross bar 90 is adapted to rest on the shoulder stop 92 provided on the base plate for holding the tension spring 86 in position when the air in the cell or tube 77 is above a predetermined amount of pressure, the shoulder stop 92 serving the same purpose as the downwardly depending portion 4 of the bracket 20 in the first mentioned device, insofar as it checks the movement of the tension spring 86 in its downward movement when the air pressure in the tires is at a set pressure.

In operation assuming that 40 pounds per square inch of pressure is used as the preferred pressure in the tires in the first mentioned device, the movable arm member 15 is held in a neutral position thereby causing the contact tip 45 of the contact brush 43 to be held out of engagement with the contact ring 46 should the pressure in the tire be reduced, for instance to 30 pounds per square inch, the air pressure within the pneumatic cell 22 is also reduced thereby causing it to collapse a sufficient degree to cause the arm member 15 to move downwardly therewith and thus cause the contact tip 45 provided on contact wiper brush 43 to contact with the high contact section 47 of the contact ring 46 as the wheel 1 rotates, thereby making and breaking the electric circuit to the indicating device 56 once in each revolution of the wheel and causing an intermittent signal to be registered on the indicating device which in turn notifies the operator of the vehicle that this particular tire needs slightly more air. When the air pressure within the tire and consequently within the pneumatic switch is approximately 15 pounds per square inch the contact tip 45 of the brush 43 contacts with the high contact section 47 and the intermediate high contact section 49 of the contact ring 46 as the brush passes by it, thus making and breaking the electric circuit to the indicating device 56 twice for each revolution of the wheel 1 and thereby causing the indicator 56 to indicate intermittent signals of a frequency double that of the first mentioned signal. Should the air pressure within the tire 2 be reduced to five pounds per square inch or the tire be flat the electric wiper brush 43 is caused by its actuating mechanism to project to its full out position and contact with the high contact section 47, the intermediate high contact and low contact sections 49 and 48 respectively, provided on the contact ring 46 thereby causing the indicating device 56 to register a steady signal to indicate to the operator of the vehicle that the pressure in the tire is very low or the tire is flat, the last mentioned continuous signal being given on the indicator 56 either when the vehicle is in motion or is at a standstill. The other switches on each of the other tires of the vehicle operate in the same manner to operate their respective indicators in circuit therewith.

It will thus be seen that I have provided a highly novel and useful form of device which is well adapted for all the purposes designated even though I have herein shown my device as comprising certain structural details it is nevertheless to be understood that numerous changes may be made therein without departing from the spirit or scope of my invention.

Having described my invention, what I claim as new and wish to secure by Letters Patent is:

1. In means for indicating the pressure in the tire of a motor vehicle, a contact ring having a high, low and intermediate high contact section thereon, and affixed to the brake housing of said wheel, a pneumatically operated electric switch secured to said wheel and rotatable therewith, said switch comprising a base plate having a centrally located projecting portion provided thereon, a guide slot provided in said projecting portion, a movable arm member containing a wiping brush on one end thereof movably mounted in said slot, a collapsible pneumatic cell secured to said arm member and said projecting portion of said base plate, means providing a passageway for leading air from said tire to said cell, said cell being adapted to operate said arm member and hold the wiping brush thereon out of contacting engagement with said contact sections on said ring at normal tire pressure and to effect engagement of said wiping brush with the contact sections of said ring at predetermined sub-pressures, an electric circuit connected to said contact ring, said electric circuit including a source of potential and an indicator device in circuit therewith, said indicator being operated to give a plurality of variable intermittent signals upon the contacting of said wiper brush with certain of said contacting sections of said ring and to give a continuous signal when the tire pressure is substantially nil.

2. In means for indicating the pressure in the tire of a moving vehicle, a contact ring including a plurality of high, low and intermediate high contact sections and affixed to the vehicle adjacent a wheel thereof, a wiping contact and operating means therefor secured to said wheel and rotatable therewith, said operating means subject to the pressure in the tire and adapted to hold said wiping contact out of engagement with said contact ring at normal tire pressure and to move said wiping contact predetermined distances toward said contact ring upon predetermined pressures below normal, whereby at a predetermined sub-pressure said wiping contact engages a predetermined number of said contact sections of said contact ring in each revolution of said wheel, a greater number of said contact sections at a lower tire pressure than said last mentioned pressure and all of said contact sections at substantially no pressure.

3. In means for indicating the pressure in the tire of a moving vehicle a contact ring including a high area contact section, a plurality of low and intermediate high contact sections and affixed to the vehicle adjacent a wheel thereof, a wiping contact and operating means therefor secured to said wheel and rotatable therewith, said operating means subject to the pressure in the tire and adapted to hold said wiping contact out of engagement with said contact ring at normal tire pressure and to move said wiping contact predetermined distances toward said contact ring upon predetermined pressures below normal, whereby at a predetermined sub-pressure said wiping contact engages a predetermined number of said contact sections of said contact ring in each revolution of said wheel, a greater number of said contact sections at a lower tire pressure than said last mentioned pressure and all of said contact sections at substantially no pressure, an electric circuit connected to said contact ring and adapted to be opened and closed upon engagement of the wiping contact with the contact sections of said contact ring, said electric circuit including a source of potential and an indicator in circuit therewith.

CHARLES D. FATOR.